Jan. 29, 1924.
J. R. GAMMETER
1,481,895
METHOD AND APPARATUS FOR MAKING RUBBER ARTICLES
Filed Nov. 19, 1921
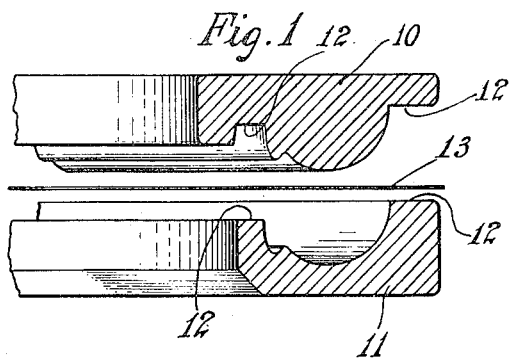
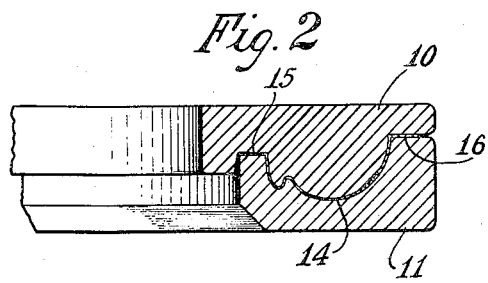
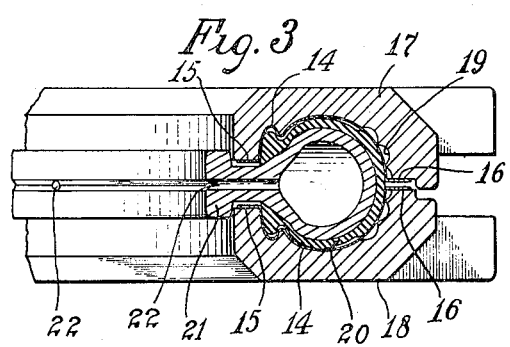
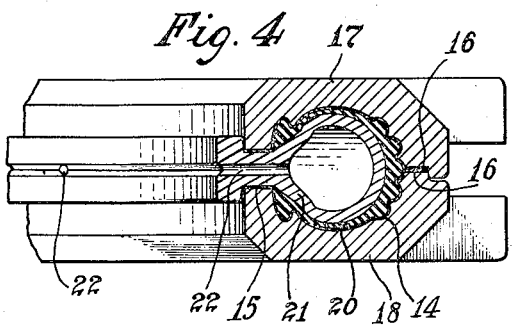
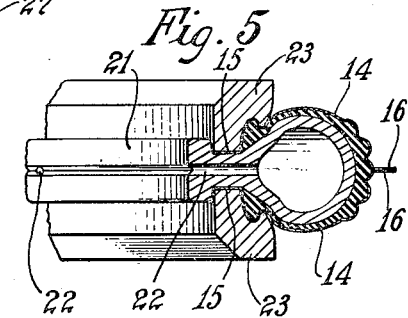
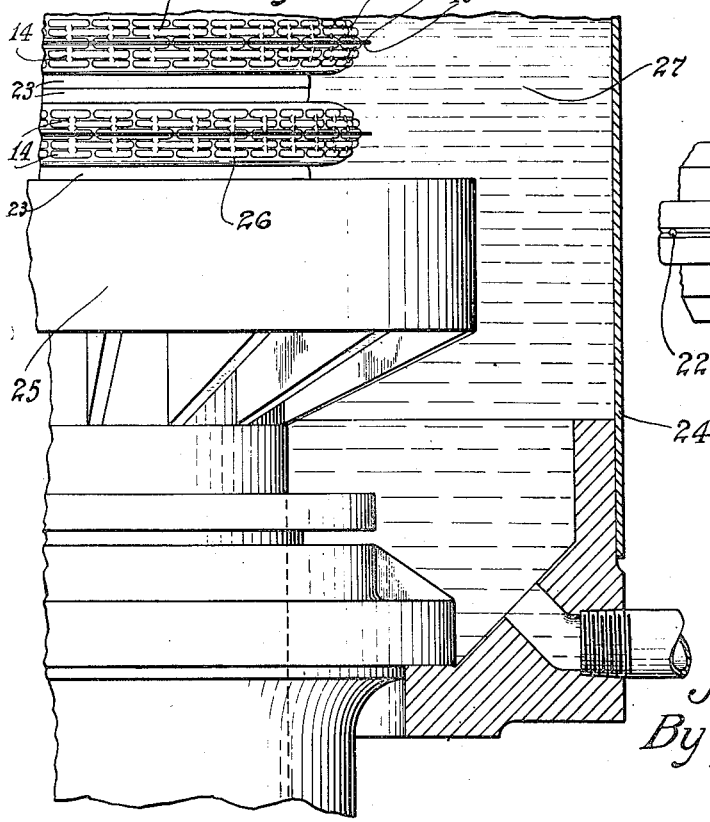
Inventor
John R. Gammeter
By Robert M. Pierson
Atty.

Patented Jan. 29, 1924.

1,481,895

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

METHOD AND APPARATUS FOR MAKING RUBBER ARTICLES.

Application filed November 19, 1921. Serial No. 516,305.

*To all whom it may concern:*

Be it known that I, JOHN R. GAMMETER, a citizen of the United States, residing at Akron, in the county of Summit and State of Ohio, have invented a certain new and useful Method and Apparatus for Making Rubber Articles, of which the following is a specification.

This invention relates to the art of making rubber articles and especially articles composed of fabric and rubber, such, for example, as pneumatic tires.

My chief objects are to produce an improved article and to facilitate production, and more particularly to avoid distortion or buckling of the fabric such as frequently occurs in the vulcanizing of tires, for example, under pressure of rigid mold members; to avoid blemishes upon the surface of the article such as are sometimes caused by air or water pocketed between the article and the mold; and to produce tires with a highly finished surface.

Of the accompanying drawings:

Fig. 1 is a fragmentary view, in cross-section and perspective, of a pair of annular die members in open position, and a sheet of metal between them.

Fig. 2 is a similar view showing the die members in closed position, the sheet of metal being formed into a tire-wrapper.

Fig. 3 is a similar view of a tire mold with a pair of tire-wrappers, a tire and a tire-core therein, the mold being lightly closed thereon.

Fig. 4 is a similar view showing the mold fully closed.

Fig. 5 is a similar view of the tire-core, tire and tire-wrappers with a pair of bead molding rings substituted for the tire-mold.

Fig. 6 is a fragmentary, vertical section of a tire vulcanizer with tire-assemblies such as that of Fig. 5 therein.

Referring to the drawings, 10 is an annular male die member, and 11 is a complementary female die member, their complementary surfaces having substantially the form of the outer surface of one side of a tire, with radial extensions 12, 12 (Fig. 1) at the inner and outer peripheries thereof, 13 is a thin, annular sheet of soft metal, preferably an alloy of about 98% tin and 2% lead or other metal or alloy suitable for giving a finished surface to rubber vulcanized in contact therewith, said sheet of metal being adapted to be formed by the dies 10, 11 into a tire-wrapper 14 with radially disposed margins 15, 16 at its inner and outer peripheries, as shown in Fig. 2. The sheet of metal constituting the tire-wrapper is preferably about $\frac{1}{32}$ of an inch thick. 17, 18 (Figs. 3 and 4) are tire mold members which may be formed, as shown, with an anti-skid tread design as indicated by the recesses 19 in Fig. 3. 20 is a tire upon a tire-forming core 21. The latter is preferably of metal and hollow, as shown, and formed with fluid inlet apertures 22, 22 through its base, communicating with its internal cavity.

Referring to Fig. 5, 23, 23 are bead molding rings assembled upon the beads of the tire and adapted to press the wrappers against the tire beads and the core to seal the wrappers, beads and core against each other. For convenience in handling, the bead molding rings 23 may be provided with any known or suitable clamping means (not shown) for holding them in assembled position on the core.

In Fig. 6, 24 is a common type of tire vulcanizer, 25 is the ram therein, 26, 26 are tire-assemblies stacked on said ram and 27 is a body of hot water with which the vulcanizer is filled.

In practicing my invention I preferably form the thin sheet-metal tire-wrappers 14 between the dies 10, 11, in the manner shown in Figs. 1 and 2, but they may be formed between the male die member 10 and a tire-mold member such as 17 or 18 and may be left in the latter when the male die is withdrawn therefrom. A more perfect fit of the wrapper to the smooth surface of a raw tire, however, is assured when the rubber is formed between the die members 10 and 11, both of the latter being smooth surfaced, and there is a further advantage in using the female die member 11 in that it may be kept in position in the die press and the wrappers may thus be more rapidly produced than if each wrapper is formed in the mold in which it is to be used. In forming the wrapper the die members may be heated, say to about 400° F., to facilitate the forming of the metal and assure its retaining its shape when the die pressure is removed.

I next assemble a pair of tire-wrappers 14, a tire 20 and a tire-core 21, as shown in Fig. 3, between the tire-mold members 17, 18, which latter may be kept in a press and preferably are kept at a temperature of about 300° F., the wrappers 14 and mold members 17 and 18 being held slightly open by the raw tire 20 upon the core 21. The heat from the mold members first softens the rubber in the tread and other outer portions of the tire, and the mold is then forcibly closed, causing the soft tread rubber to press the wrappers 14 into the recesses 19 of the tread design in the mold, the outer peripheral margins 16 of the wrappers to be pressed together in sealed relation, and the inner peripheral margins 15 to lie flat against the tongue of the tire-core, all as shown in Fig. 4. The air is thus driven from between the tire and the wrappers, and from between the latter and the mold, and the tire is supplied with a tight fitting envelope of thin, flexible metal which remains thereon when the tire is removed from the mold.

As the rubber of the outer regions of the tire, heated by the flow of heat from the mold, deforms the metal of the wrappers 14 into the recesses 19 of the mold while the rubber in the inner regions of the tire is relatively cool and stiff, the fabric is not much deformed or buckled by the flow of rubber. To insure the relatively cool and stiff condition of the inner part of the tire-body, a cooling fluid may be circulated in the hollow core 21, through the apertures 22 during this step of the process. The tire may be allowed to remain within the hot molds, as shown in Fig. 4, for a sufficient time to partially vulcanize the rubber of the outer portions, and particularly the tread portion, of the tire after the latter has conformed to the tread design of the mold, and different compounds may be used to determine the degree of vulcanization which will result in different parts of the tire.

After providing the tire with the thin metal envelope, consisting of the wrappers 14, as shown in Fig. 4, I substitute bead-molding rings 23 (Figs. 5 and 6) for the mold members 17, 18, said rings embracing only the bead portions of the tire and leaving the main body of the tire enclosed only in its flexible metal envelope, and stack a number of the tires upon the ram 25 of the vulcanizer 24, as shown in Fig. 6. Hydraulic pressure is then applied to the ram, pressing the rings 23 against the wrappers 14 at the bead portions of the tire and sealing the tire-core, beads and wrappers against each other. A heating medium such as the water 27, preferably at a temperature of about 288° F., and a pressure of about 300 lbs. to the square inch, is then introduced into the vulcanizer and the tires are thereby completely vulcanized, maintaining their external form with the tread designs thereon by reason of the high pressure of the heating medium on the outer surface of the tire-wrappers, which prevents substantial swelling of the rubber and maintains the wrapper margins 16 in sealed relation so that the heating fluid is not permitted to come in contact with and blemish the surface of the tire. The wrappers 14 being flexible, the fabric plies of the tire are permitted to readjust themselves when the body of the tire becomes soft and in case any distortion or buckling of the fabric has occurred in the forming of the tread design by the rigid mold members 17, 18, it is relieved during the final vulcanization between the flexible wrappers.

During vulcanization the heating fluid enters the hollow cores 21 through the apertures 22 and by internal pressure prevents the cores from collapsing in case they are not of such form or construction as to withstand high pressures, and also heats the tires through the walls of the cores.

After the vulcanization is completed the bead molding rings 23 are removed and the wrappers 14 are stripped from the tires, which have a smooth and glossy finish, and the wrappers, or the metal thereof, may be used over again.

I prefer to use water as the heating medium in order to obtain a higher external pressure upon the tire than can be obtained with steam at vulcanizing temperature, but I do not wholly limit my claims to the use of water.

A large saving may be effected in the cost of production, since the molding operation, represented by Figs. 3 and 4, requires only 3 or 4 minutes, so that relatively few molds are required as compared with processes in which the tires are completely vulcanized in the rigid molds. The mold members 17, 18 may be kept in position in a platen press, and as the bead molding rings, 23, Fig. 5, are comparatively light, a considerable saving in the handling of heavy equipment is effected.

Further modifications than are herein mentioned may be resorted to without departing from the scope of my invention as claimed.

I claim:

1. The method of making an article of vulcanizable material which comprises preforming an envelope of flexible material substantially to fit the article, encasing the article in said envelope, shaping the article and envelope as a unit by molding pressure, and vulcanizing the article in said envelope.

2. The method of making an article of vulcanizable material which comprises preforming an envelope of flexible material substantially to fit the article, encasing the article in said envelope, molding the article and envelope, and vulcanizing the article in said envelope under sufficient fluid pressure substantially to prevent swelling of said article.

3. The method of making an article of fibrous material and a vulcanizable material which comprises applying a thin metal wrapper to the article, heating the outer regions of the article through said wrapper, applying molding pressure to the article to shape said article and the wrapper thereon, and vulcanizing said article with the wrapper thereon.

4. The method of making an article of fibrous material and rubber which comprises applying a thin metal wrapper to the article, heating the outer regions of said article through said wrapper, molding said article and said wrapper as a unit, and applying a heating fluid to said wrapper to vulcanize said article, said fluid being under such pressure as to prevent the swelling of said article from substantially deforming said wrapper.

5. The method of making an article of fibrous material and rubber which comprises applying a thin metal wrapper to the article, heating an outer region of said article while cooling an inner region thereof, deforming said wrapper by pressure applied thereto through the substance of said article, and vulcanizing said article with said wrapper thereon.

6. The method of making an article of fibrous material and a vulcanizable material which comprises applying a flexible wrapper to said article, heating the outer regions of said article molding said article and said wrapper as a unit between rigid mold members, and vulcanizing said article in said wrapper by applying water to the latter at vulcanizing temperature and at sufficient pressure to prevent substantial deformation of said wrapper.

7. The method of making an article of vulcanizable material which comprises preforming a plurality of thin metal wrappers adapted to fit the surface of said article, applying said wrappers to said article, compressing the resulting structure in a mold to mold the article and the wrappers as a unit, and vulcanizing the article with the wrappers thereon.

8. The method of making a rubber tire which comprises vulcanizing the tire in a thin metal envelope while applying mechanical molding pressure to the bead portions of the tire and fluid pressure to the exterior of said envelope.

9. The method of making a rubber tire which comprises vulcanizing the tire in a thin metal envelope adapted to produce a glossy finish on the tire while applying mechanical molding pressure to the bead portions of the tire and fluid pressure to the exterior of said envelope.

10. The method of making a rubber tire which comprises vulcanizing the tire in a thin metal envelope comprising tin while applying mechanical molding pressure to the bead portions of the tire and fluid pressure to the exterior of said envelope.

11. The method of making a rubber tire which comprises mounting the tire upon a rigid core, applying a thin metal wrapper thereto, applying heat and molding pressure to said tire and wrapper to mold them as a unit, and then applying water to said wrapper at vulcanizing temperature and at higher pressure than the steam pressure corresponding to said temperature.

12. The method of making a rubber tire which comprises mounting the tire upon a rigid core, applying thereto a pair of thin metal wrappers each adapted to fit a side of the tire, compressing the wrappers and tire in a mold to shape them as a unit, and vulcanizing the tire in said wrappers.

13. The method of making a tire which comprises mounting the tire on a rigid core, forming a pair of thin annular metal wrappers adapted to fit the sides of the tire and having radially extending inner and outer peripheral margins, applying said wrappers to the tire, pressing the wrappers and tires in a mold to shape them and to seal the outer peripheral margins of the wrapper to each other, sealing the beads of the tire against the core and against the adjacent parts of the wrappers, and applying a heating fluid to the wrappers.

14. The method of making a rubber tire which comprises heating the outer region of the tire, shaping the tire in a mold and subsequently vulcanizing the tire by heating it through a thin metal envelope by the application of water to the latter at vulcanizing temperature and at a pressure greater than the steam pressure corresponding to said temperature.

15. Apparatus for making a rubber tire comprising a pair of rigid mold members and a pair of thin, deformable sheet metal members substantially fitting respective sides of the tire, said sheet metal members being adapted to be deformed by the pressure of said rigid mold members upon the tire.

16. Apparatus for making pneumatic tires comprising a pair of rigid mold members, a pair of thin deformable sheet metal members substantially fitting respective sides of a tire, and a rigid tire-supporting core, said sheet metal members being adapted to accommodate themselves to the form of said rigid mold members under the molding pressure of the latter.

17. Apparatus for making pneumatic tires comprising a pair of rigid mold members, a pair of thin deformable sheet metal members substantially fitting respective sides of a tire, and adapted to be sealed against the tire by the pressure of said rigid mold members, and a hollow tire-supporting core having fluid-inlet apertures through its base.

18. Apparatus for making tires comprising a thin metal shell structure adapted to fit the entire outer surface of the tire, and a pair of bead-clamping rings, adapted to embrace only the bead portions of said structure and by their pressure to seal the same against the tire.

19. Apparatus for making tires comprising a hollow tire-supporting core having an aperture through its base, a thin metal shell structure adapted to fit the entire outer surface of the tire, and a pair of rigid bead-clamping rings adapted to press said shell structure against the bead portion of the tire and the latter against said tire-supporting core.

20. Apparatus for making tires comprising the combination of a pair of sheet-metal wrappers adapted to fit respective sides of the tire and each formed with a radial margin around its outer periphery, clamping means for holding said wrappers against the bead portions only of said tire, and means for applying fluid under pressure to the exterior of said wrappers, the latter being mounted upon a tire.

In witness whereof I have hereunto set my hand this 16th day of November 1921.

JOHN R. GAMMETER.